US012807020B2

(12) United States Patent
Guan et al.

(10) Patent No.: US 12,807,020 B2
(45) Date of Patent: Nov. 24, 2026

(54) PROACTIVE MOBILE CHARGING BOT DEPLOYMENT USING DYNAMIC INTERNET OF THINGS DATA ANALYSIS

(71) Applicant: International Business Machines Corporation, Armonk, NY (US)

(72) Inventors: Zhi Li Guan, Beijing (CN); Su Liu, Austin, TX (US); Kun Yang, Beijing (CN); Yang Liang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 37 days.

(21) Appl. No.: 18/754,481

(22) Filed: Jun. 26, 2024

(65) Prior Publication Data

US 2026/0001426 A1 Jan. 1, 2026

(51) Int. Cl.

| | |
|---|---|
| ***B60L 53/35*** | (2019.01) |
| ***B60L 53/30*** | (2019.01) |
| ***B60L 53/62*** | (2019.01) |
| ***B60L 53/66*** | (2019.01) |

(52) U.S. Cl.

CPC ............. *B60L 53/35* (2019.02); *B60L 53/305* (2019.02); *B60L 53/62* (2019.02); *B60L 53/66* (2019.02); *B60L 2250/16* (2013.01)

(58) Field of Classification Search

CPC ........... B60L 53/35; B60L 53/62; B60L 53/66
See application file for complete search history.

(56) References Cited

U.S. PATENT DOCUMENTS

| | | | |
|---|---|---|---|
| 10,744,885 | B2 | 8/2020 | Jammoul |
| 11,571,974 | B2 | 2/2023 | Gaither |
| 2020/0247340 | A1 | 8/2020 | Furukawa |

(Continued)

FOREIGN PATENT DOCUMENTS

| | | | |
|---|---|---|---|
| CN | 117421777 | A | 1/2024 |
| JP | 2009240008 | A | 10/2009 |

OTHER PUBLICATIONS

Disclosed Anonymously et al., "Method and System for Providing Optimal Charging Service to Electric Vehicles", An IP.com Prior Art Database Technical Disclosure, IP.com No. IPCOM000259784D, IP.com Electronic Publication Date: Sep. 18, 2019, 3 pages.

(Continued)

*Primary Examiner* — Roy Rhee
(74) *Attorney, Agent, or Firm* — Anthony M. Pallone

(57) ABSTRACT

According to one embodiment, a method, computer system, and computer program product for deploying mobile charging units for electric vehicles. The embodiment may include receiving data from a set of Internet-of-Things (IoT) enabled electric vehicles (EVs). The data includes a current percentage of remaining battery power for an IoT enabled EV of the set of IoT enabled EVs. In response to determining that the current percentage of remaining battery power for the IoT enabled EV falls below a specified EV battery threshold, the embodiment may include selecting at least one IoT enabled mobile charging unit (MCU) from a set of IoT enabled MCUs. The embodiment may include deploying the selected at least one IoT enabled MCU to a determined geographic location. The embodiment may include notifying a user of the IoT enabled EV of availability of the selected at least one IoT enabled MCU at the determined geographic location.

20 Claims, 2 Drawing Sheets

(56) References Cited

U.S. PATENT DOCUMENTS

| | | | | |
|---|---|---|---|---|
| 2021/0347275 | A1 | 11/2021 | Chakraborty | |
| 2021/0404820 | A1* | 12/2021 | Schumacher | B60L 53/63 |
| 2023/0066396 | A1* | 3/2023 | Lee | B60L 8/003 |
| 2023/0322110 | A1* | 10/2023 | Lu | G01C 21/3438<br>701/410 |
| 2025/0289342 | A1* | 9/2025 | Bagalkoti | B60L 58/12 |

OTHER PUBLICATIONS

Hu et al., "IoT-Based Proactive Energy Supply Control for Connected Electric Vehicles", Shanghai, China, (c) 2018 IEEE, 11 pages.

Kuma et al., IoT-Based Monitoring and Management of Electric Vehicle Charging Systems for DC Fast Charging Facility, Chapter 10, ResearchGate, Jan. 2020, 17 pages.

Peherkar et al., "Chargebuddy—EV charging slot booking system using ai chatbot application", e-ISSN: 2582-5208, International Research Journal of Modernization in Engineering Technology and Science, vol. 05/Issue: Nov. 11, 2023, 4 pages.

* cited by examiner

PROACTIVE MOBILE CHARGING BOT DEPLOYMENT USING DYNAMIC INTERNET OF THINGS DATA ANALYSIS

BACKGROUND

The present invention relates generally to the field of computing and the Internet of Things (IoT), and more particularly to proactive mobile charging of electric vehicles (EVs).

The IoT describes devices embedded with sensors, processing ability, software, and other technologies that connect and exchange data with other devices and systems over the internet or other communications network. These devices may range from everyday items such as household appliances, wearable devices, and vehicles to industrial machines, infrastructure components, and more. With regard to vehicles, electric vehicles are increasingly becoming an integral part of the IoT ecosystem through the integration of various IoT technologies that enhance the functionality, efficiency, and user experience of electric vehicles. For instance, IoT enabled EVs may collect and transmit data about their performance, battery status, geographic location, and other operational parameters. This data can be used to remotely monitor vehicle health, predict maintenance, and optimize driving patterns. The IoT may also enable EVs to receive data such as real-time traffic updates, road conditions, charging networks, and navigation assistance. In recent years, the popularity and increased adoption of EVs has increased due to a combination of technological advancements, environmental awareness, supportive policies, and evolving market dynamics.

SUMMARY

According to one embodiment, a method, computer system, and computer program product for deploying mobile charging units for electric vehicles. The embodiment may include receiving data from a set of Internet-of-Things (IoT) enabled electric vehicles (EVs). The data includes a current percentage of remaining battery power for an IoT enabled EV of the set of IoT enabled EVs. In response to determining that the current percentage of remaining battery power for the IoT enabled EV falls below a user specified EV battery threshold, the embodiment may include selecting at least one IoT enabled mobile charging unit (MCU) from a set of IoT enabled MCUs. The embodiment may include deploying the selected at least one IoT enabled MCU to a determined geographic location. The embodiment may include notifying a user of the IoT enabled EV of availability of the selected at least one IoT enabled MCU at the determined geographic location.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
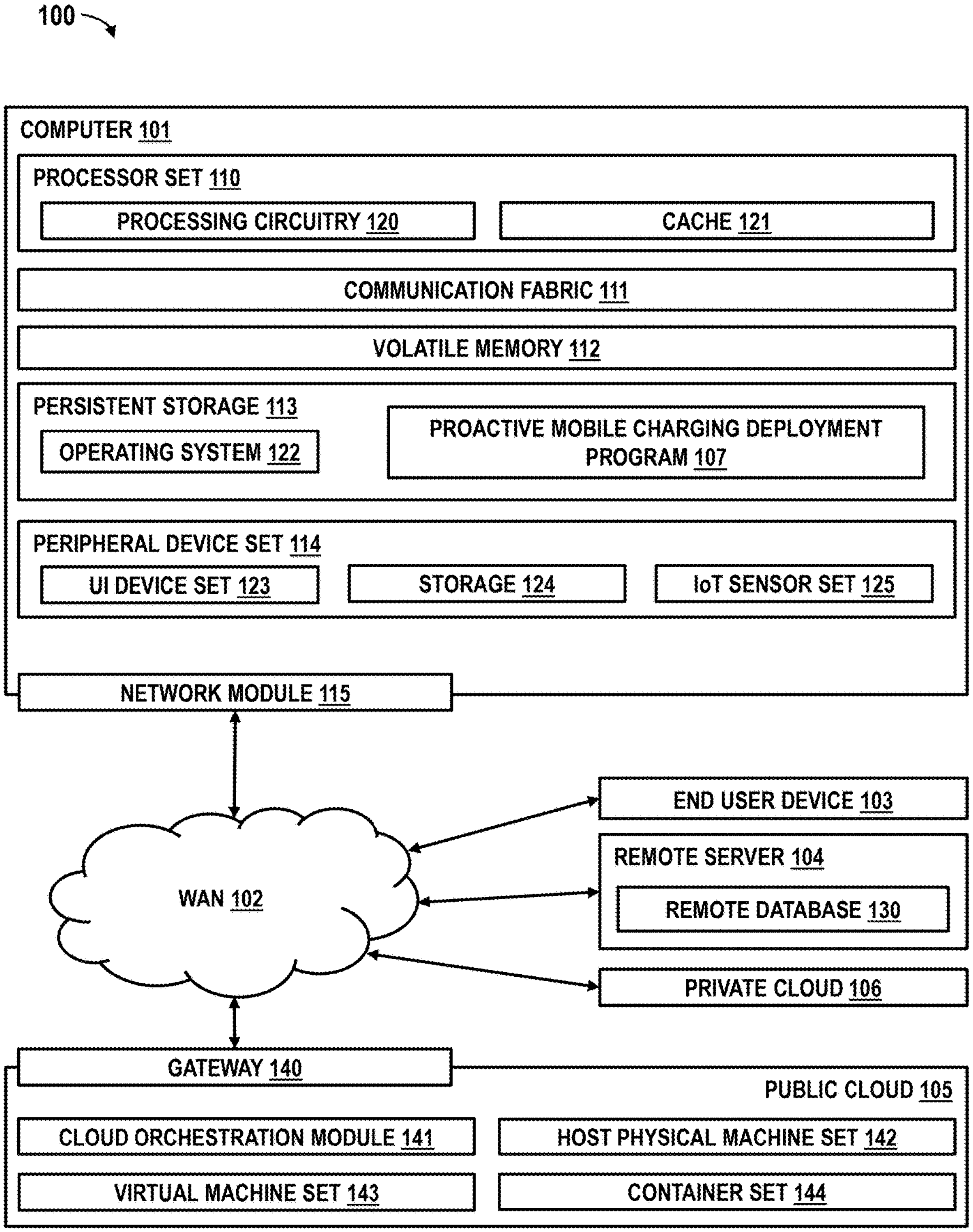
FIG. 1 illustrates an exemplary computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing and the Internet of Things (IoT), and more particularly to proactive mobile charging of electric vehicles (EVs). The following described exemplary embodiments provide a system, method, and program product to, among other things, define and facilitate a proactive mobile charging deployment bot capable of dynamic IoT data analysis and management of electric vehicle battery charging requirements. Therefore, the present embodiment has the capacity to improve the technical field of electric vehicle mobile charging by dynamically monitoring information of a network of one or more electric vehicles and proactively deploying one or more mobile charging units based on predicted battery charging needs of a monitored electric vehicle, thus improving the battery charging experience of an electric vehicle user as well as the overall electric vehicle user experience.

As previously described, the IoT describes devices embedded with sensors, processing ability, software, and other technologies that connect and exchange data with other devices and systems over the internet or other communications network. These devices may range from everyday items such as household appliances, wearable devices, and vehicles to industrial machines, infrastructure components, and more. Regarding vehicles, electric vehicles are increasingly becoming an integral part of the IoT ecosystem through the integration of various IoT technologies that enhance the functionality, efficiency, and user experience of electric vehicles. For instance, IoT enabled electric vehicles may collect and transmit data about their performance, battery status, geographic location, and other operational parameters. This data can be used to remotely monitor vehicle health, predict maintenance, and optimize driving patterns. The IoT may also enable electric vehicles to receive data such as real-time traffic updates, road conditions, charging networks, and navigation assistance. In recent years, the popularity and increased adoption of electric vehicles has increased due to a combination of technological advancements, environmental awareness, supportive policies, and evolving market dynamics.

As mentioned above, the growing popularity and adoption of electric vehicles are the result of a confluence of several key factors, chief among which are technological advancements. For instance, improvements in battery technology have increased their energy density, thereby enabling increased driving ranges on a single charge. Also, developments in fast charging technology allow electric vehicles to be charged more quickly, thereby reducing user experienced inconvenience associated with longer charging times. However, despite such technological advancements, EV range anxiety and practicality for long-distance travel persist as challenges to the EV charging experience of electric vehicle users. Although the electric vehicle charging infrastructure (i.e., a distributed network of stationary EV charging stations) has experienced some expansion, there remains a lack of charging infrastructure and accessibility which creates uncertainty about availability and compatibility of needed electric vehicle charging stations. As such, long distance travel via EV requires more planning as users of electric vehicles assume a risk of running out of power during transit. While electric vehicle users may choose to use emergency EV charging services in response to running out of power, the cost of such services may be very high for both EV users and EV charging service providers. It may therefore be imperative to have a proactive mobile charging deployment system in place to dynamically monitor real-time information (e.g., location and battery status) of one or more electric vehicles and proactively deploy one or more mobile charging units to a monitored electric vehicle based on its real-time situation (e.g., having reached a charging threshold). Thus, embodiments of the present invention may be advantageous to, among other things, define a proactive mobile charging deployment bot which may perform dynamic analysis of data received from IoT enabled devices (e.g., EVs, EV charging facility units, & mobile charging units), control and communicate with one or more mobile charging units, monitor and communicate with a network of electric vehicles, store data associated with monitored EVs and their respective users, predict battery charging requirements of monitored electric vehicles, select and deploy a mobile charging unit to a determined location, and instruct a user (e.g., a driver or passenger) of a monitored electric vehicle to proceed to a determined location and rendezvous with a mobile charging unit. The present invention does not require that all advantages need to be incorporated into every embodiment of the invention.

According to at least one embodiment, a proactive mobile charging deployment (PMCD) program may monitor one or more electric vehicles registered with the PMCD program and may also monitor multiple stationary EV charging stations and mobile charging units. According to at least one embodiment, the PMCD program may receive data from a monitored electric vehicle, as well as data from monitored mobile charging units. The data received from the monitored electric vehicle may include its current geographic location and battery status information. According to at least one embodiment, the PMCD program may analyze the data received from the monitored electric vehicle and determine that at least one battery of the electric vehicle requires charging. In response to such a determination, the PMCD program may select a monitored mobile charging unit, based in part on its received data, and deploy it to a determined location. According to at least one embodiment, the PMCD program may also notify a user of the monitored electric vehicle of the charging requirement and instruct the user to proceed to the determined location for rendezvous with the deployed mobile charging unit. According to at least one other embodiment, the PMCD program may access a navigation system of the monitored electric vehicle and input a route, with directions, to the determined location which may then be presented to the user via a display and audio system of the electric vehicle.

According to at least one further embodiment, the PMCD program may monitor and receive data including, at least, the respective geographic locations and the respective battery statuses of a network of multiple registered electric vehicles. Based on analysis of the received data, the PMCD program may identify a geographic area within which a battery charging need is predicted to arise for one or more registered electric vehicles. In response to this identification, the PMCD program may proactively deploy one or more mobile charging units to the identified geographic area and notify those registered electric vehicles having a predicted battery charging need within the near future of their respective proximities to an available mobile charging unit within the identified geographic area. Such deployment of mobile charging units by the PMCD program may enable a quick response to a current or predicted battery charging need of a registered electric vehicle.

According to yet another embodiment, the PMCD program may provide a set-up process through which a user may opt-in to EV charging management by the program and register an electric vehicle. As part of the registration process, the PMCD program may collect data from the user including user identification information, user financial information, user preferences, and information of the electric vehicle associated with the user and registered with the PMCD program. Furthermore, as a result of the registration process, the PMCD program may be enabled to access and receive data from systems of the electric vehicle such as, but not limited to, diagnostic and information systems, as well as infotainment (e.g., audio & displays) and navigation (e.g., global positioning system (GPS) & mapping) systems. According to such an embodiment, the PMCD program may store collected user specific data within respective data structures (e.g., a respective data file or data array for each user).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to monitor a distributed network of registered electric vehicles and mobile charging units, and dynamically deploy a mobile charging unit to a registered electric vehicle having a current or predicted battery charging need.

Referring to FIG. 1, an exemplary computing environment 100 is depicted, according to at least one embodiment. Computing environment 100 contains an example of an environment for the execution of at least some of the computer code involved in performing the inventive methods, such as proactive mobile charging deployment (PMCD) program 107. In addition to PMCD program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and PMCD program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in PMCD program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in PMCD program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, another sensor may be a smart lock, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network or a mesh network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to at least one other embodiment, in addition to taking any of the forms discussed above with computer 101, EUD 103 may further be an IoT enabled device (e.g., a smart EV, a smart autonomous vehicle capable of EV charging, a component of a stationary EV charging station, a human-operated mobile charging vehicle) capable of connecting to computer 101 via WAN 102 and network module 115 and capable of receiving instructions from PMCD program 107.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The PMCD program 107 may be a program capable of defining a proactive mobile charging deployment method, registering electric vehicles for battery charging management, receiving data from IoT enabled devices (e.g., EVs, EV charging station units/components, & autonomous and/or human operated mobile charging units), performing dynamic analysis of data received from IoT enabled devices, controlling and communicating with one or more mobile charging units, monitoring and communicating with a network of registered electric vehicles, receiving and storing data associated with monitored EVs and their respective users, determining respective thresholds of required battery charging for monitored electric vehicles, determining a current battery charging need of one or more monitored electric vehicles, predicting a future battery charging need of one or more monitored electric vehicles, identifying a geographic area containing one or more monitored electric vehicles with a current or predicted battery charging need, selecting and deploying appropriate one or more mobile charging units to a determined geographic location, notifying a user (e.g., a driver or passenger of the EV) of availability of one or more mobile charging units and their respective proximities to the user, instructing a user of a monitored electric vehicle to proceed to a determined geographic location and rendezvous with a mobile charging unit, and accessing an infotainment and/or navigation system of a monitored electric vehicle to provide visual and/or audio information of a route to a determined geographic location. In at least one embodiment, PMCD program 107 may require a user to opt-in to system usage upon opening or installation of PMCD program 107, or upon requesting access to a mobile charging deployment system managed by PMCD program 107. Notwithstanding depiction in computer 101, PMCD program 107 may be stored in and/or executed by, individually or in any combination, end user device 103, remote server 104, public cloud 105, and private cloud 106 so that functionality may be separated among the devices. The proactive mobile charging deployment method is explained in further detail below with respect to FIG. 2.

Figure 2:
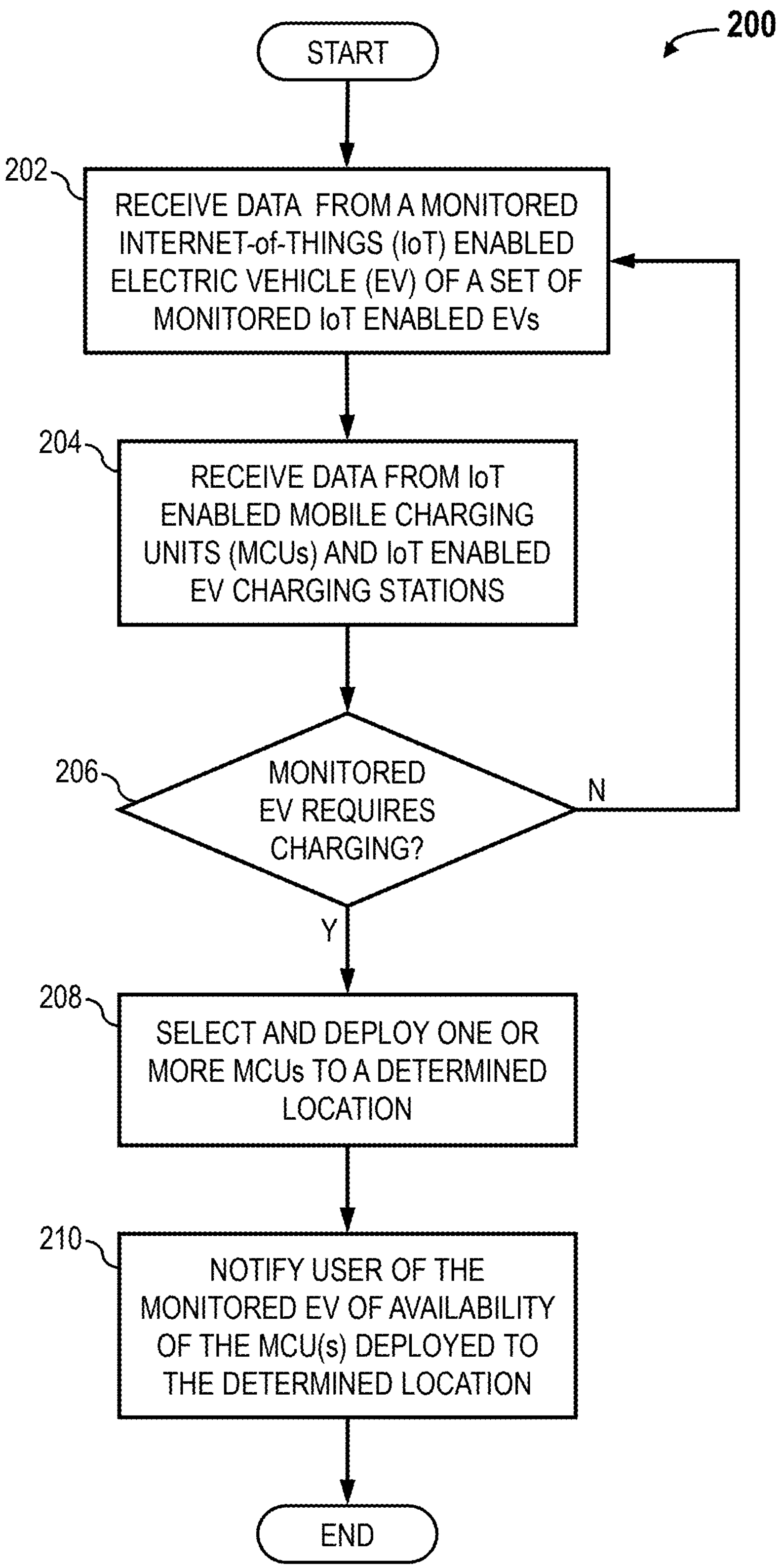
FIG. 2 illustrates an operational flowchart for providing a mobile charging unit to an electric vehicle in need of battery charging via a proactive mobile charging deployment process, according to at least one embodiment.

Referring now to FIG. 2, an operational flowchart for deploying a mobile charging unit to an electric vehicle in need of battery charging via a proactive mobile charging deployment process 200 is depicted according to at least one embodiment. At 202, PMCD program 107 receives data from an IoT enabled electric vehicle, of a set of IoT enabled EVs being monitored by PMCD program 107. According to at least one embodiment, the data received from the monitored electric vehicle may include diagnostic information of the electric vehicle such as, but not limited to, a current percentage of remaining power for each battery of the EV, an average rate of discharge for each battery of the EV, an overall electric consumption of the EV, a time since last battery charge, and a distance traveled since last battery charge. According to at least one embodiment, the received data may also include location information of the electric vehicle such as, but not limited to, a geographic location (e.g., GPS co-ordinates) of the EV, traffic and road conditions within a defined radius the geographic location of the EV, and information of a route being followed by the electric vehicle. It should be noted that, at 202, PMCD program 107 also receives respective diagnostic and location information for each IoT enabled EV being monitored. It should also be noted that data from a monitored electric vehicle may be received by PMCD program 107 periodically or continuously while the monitored electric vehicle is in use.

According to at least one embodiment, PMCD program 107 may store diagnostic and location information received from a monitored electric vehicle within a data file/array, created during a set-up process of PMCD program 107, of a user associated with the monitored electric vehicle. In doing so, PMCD program 107 may compile historical data of the monitored electric vehicle and its associated user and derive patterns such as battery usage patterns of the monitored electric vehicle (e.g., avg. distances traveled between EV battery charges, avg. rate of EV battery discharge) and driving patterns of the associated user (e.g., frequently traveled routes, frequently utilized EV charging equipment, usage of service provided by PMCD program 107).

As mentioned above and according to at least one other embodiment, prior to an electric vehicle being monitored by PMCD program 107, PMCD program 107 may execute a set-up process through which a user may opt-in to EV charging management by PMCD program 107 and register an electric vehicle associated with the user. As part of the registration process, PMCD program 107 may collect data from the user including user identification information (e.g., user ID and contact information), user financial information (e.g., credit card number, banking, and/or digital payment information), user preferences, and information of the electric vehicle associated with the user. User preference data may include an EV battery threshold below which a battery of the electric vehicle requires charging and a specified type (or types) of compatible EV battery charging equipment to be used with the electric vehicle. Information of the electric vehicle may include a make and model of the EV, an EV_ID, number of batteries or cells within the EV and their respective capacities, EV battery manufacture date(s), battery type and compatibility of the EV, and an EV range of travel. Furthermore, as a result of the registration process, PMCD program 107 may be enabled to access and receive (i.e., monitor) real-time data from systems of the electric vehicle such as, but not limited to, diagnostic and information systems, as well as infotainment (e.g., audio & displays) and navigation (e.g., global positioning system (GPS) & mapping) systems. According to such an embodiment, PMCD program 107 may store collected data within a created user specific data structure (e.g., a respective data file or data array for each user). User specific data structures created by PMCD program 107 during a set-up process may be stored within storage 124 or remote database 130 for later modification and/or reference by PMCD program 107 during process 200.

Next, at 204, PMCD program 107 receives data from one or more IoT enabled mobile charging units (MCUs) and one or more IoT enabled EV charging stations. According to at least one embodiment, an IoT enabled mobile charging unit may include a smart autonomous vehicle which is managed by PMCD program 107 and can travel to a determined location and provide an electric charge to a battery of an electric vehicle. Data received from a mobile charging unit may include an identifier of the MCU, an availability status (e.g., in use or available) of the MCU, a geographic location of the MCU, type of EV battery charging equipment onboard the MCU, number of onboard batteries available for charge and their respective percentages of remaining power, and an MCU range of travel. According to at least one embodiment, an IoT enabled EV charging station may include one or more stationary EV charging units which are in communication with PMCD program 107 and capable of providing an electric charge to a battery of an electric vehicle. Data received from an EV charging station may include a geographic location of the EV charging station, a number of stationary EV charging units present within the EV charging station, and, for each EV charging unit present within the station, an identifier of the EV charging unit, an availability status (e.g., in use or available) of the EV charging unit, and a type, or types, of EV battery charging equipment utilized at the EV charging unit. It should be noted that data from mobile charging units and EV charging stations may be received by PMCD program 107 periodically or continuously. In at least one other embodiment, an IoT enabled mobile charging unit may include a human-operated mobile charging vehicle which is managed by PMCD program 107 and can travel to a determined location and provide an electric charge to a battery of an electric vehicle.

At 206, PMCD program 107 determines whether the monitored electric vehicle requires charging of one or more its batteries. In making this determination, PMCD program 107 may, according to at least one embodiment, reference a data file or data array, stored within storage 124 or remote database 130, of a user associated with the monitored electric vehicle. More specifically, PMCD program 107 may compare data received at step 202, which includes a current percentage of remaining power of a battery of the monitored electric vehicle, to an EV battery threshold specified within the user's preferences. According to at least one embodiment, PMCD program 107 may determine that the monitored electric vehicle requires charging where the current percentage of remaining power of a battery of the monitored EV is at or below the specified EV battery threshold. In at least one other embodiment, PMCD program 107 may also factor in additional information of the user's data file/array (e.g., derived patterns of battery usage and driving) when determining whether the monitored electric vehicle requires charging of one or more its batteries. In response to determining that the monitored electric vehicle requires charging of one or more its batteries (step 206, "Y" branch), the proactive mobile charging deployment process 200 may proceed to step 208. In response to determining that monitored electric vehicle does not require charging of one or more its batteries (i.e., the current percentage of remaining power of a battery of the monitored EV exceeds the specified EV battery threshold) (step 206, "N" branch), the proactive mobile charging deployment process 200 may return to step 202 for continued monitoring of the electric vehicle.

According to at least one other embodiment, at 206, PMCD program 107 may, alternatively or additionally, determine whether a geographic area within which a battery charging need is predicted to arise for one or more monitored electric vehicles is identified. As noted above, PMCD program 107 may receive respective diagnostic and location information including, at least, the respective geographic locations and the respective battery statuses of multiple electric vehicles being monitored by PMCD program 107. Based on analysis of the received diagnostic and location data, PMCD program 107 may identify a geographic area within which a battery charging requirement is predicted to arise for one or more monitored electric vehicles. For example, PMCD program 107 may individually evaluate received data metrics such as EV geographic location, current percentage of remaining power for each EV battery, average rate of discharge for each EV battery, and overall EV electric consumption for each monitored electric vehicle. Through such evaluation, PMCD program 107 may identify a geographic area (e.g., a radius of x miles) in which one or more monitored EVs will require charging of their respective batteries in the near future (e.g., within the next y minutes).

Next, at 208, in response to determining that the monitored electric vehicle requires charging of one or more its batteries, PMCD program 107 selects and deploys one or more managed mobile charging units to a determined location. According to at least one embodiment, selection of a mobile charging unit may be based on data received from the MCU at step 204 as well as information about user preferences accessed from a data file/array of the user. For example, PMCD program 107 may evaluate the availability status of the MCU, the geographic location of the MCU, the type of EV battery charging equipment onboard the MCU, the number and power levels of onboard batteries available for charge, the range of travel of the MCU, and user specified type(s) of compatible EV battery charging equipment to be used with the electric vehicle in order to ensure that an appropriate MCU is selected for deployment. An appropriate MCU may be one that is available, possesses EV charging equipment which is compatible with the monitored electric vehicle, possesses a battery with power to provide a charge to the monitored electric vehicle, and can travel to the determined location. According to at least one embodiment, PMCD program 107 may determine the location based on the geographic location and range of the MCU as well as the location information of the monitored electric vehicle received at step 202. Accordingly, the determined location may be a location along a route being traveled by the monitored electric vehicle or a location within a current range of the monitored electric vehicle, and PMCD program 107 may instruct a selected MCU to proceed to the determined location.

According to an embodiment in which PMCD program 107 has identified a geographic area within which a battery charging need is predicted to arise for one or more monitored electric vehicles, PMCD program 107 may, at 208, proactively deploy one or more mobile charging units to a determined location within the identified geographic area. In such an embodiment, selection of the one or more MCUs for deployment may be based on data received from the MCUs such as their respective availability statuses, geographic locations, types of onboard EV battery charging equipment, number and power levels of onboard batteries available for charge, and range of travel. Furthermore, selection of the one or more MCUs for deployment may be further based on data accessed from respective user preferences of the one or more monitored electric vehicles within the identified geographic area (e.g., user specified types of compatible EV battery charging equipment to be used with the electric vehicles). Also, in such an embodiment, the determined location may be a centrally positioned location within the identified geographic area or a centrally positioned location relative to the locations of the one or more monitored electric vehicles within the identified geographic area.

According to at least one further embodiment, in response to determining that the monitored electric vehicle requires charging of one or more its batteries, PMCD program 107 may, either alternatively or additionally, notify a user of the monitored electric vehicle of one or more EV charging stations which are in communication with PMCD program 107 and which are located within range of the monitored electric vehicle and/or located along a route being traveled by the monitored electric vehicle. As part of the notification, PMCD program 107 may display, via an infotainment system of the monitored electric vehicle, respective data of the one or more EV charging stations (received at 204) including respective characteristics such as geographic location, number of available EV charging units, and type(s) of EV battery charging equipment utilized. Further, as part of the notification, PMCD program 107 may also display, via the infotainment or a navigation system of the monitored electric vehicle, the location(s) of the one or more EV charging stations relative to the location of the monitored electric vehicle, as well as routing information (i.e., a route and corresponding directions) to an EV charging station, of the one or more EV charging stations, selected by the user.

At 210, PMCD program 107 notifies the user of the monitored electric vehicle of the availability of the one or more mobile charging units deployed to the determined location. As part of the notification PMCD program 107 may, according to at least one embodiment, display, via an infotainment system of the monitored electric vehicle, respective data of the deployed one or more mobile charging units including respective characteristics such as geographic location (i.e., the determined location), type of onboard EV battery charging equipment, and number and power levels of onboard batteries available for charge. Further, as part of the notification, PMCD program 107 may also display, via the infotainment system or a navigation system of the monitored electric vehicle, the geographic location(s) of the one or more mobile charging units deployed to the determined location relative to the geographic location of the monitored electric vehicle, as well as routing information (i.e., a route and corresponding directions) to the determined location. Additionally, according to at least one other embodiment, PMCD program 107 may display an EV battery charging monetary cost associated with each deployed mobile charging unit and allow the user to confirm or deny EV battery charging via a deployed mobile charging unit. It should be noted that although respective geographic locations of deployed MCUs and EV charging stations may be viewed by a user, PMCD program 107 may prevent a user of a monitored electric vehicle from viewing respective geographic locations of other users of monitored EVs. However, according to at least one embodiment, an administrative user of PMCD program 107 may be enabled to view respective geographic locations of multiple users as well as respective geographic locations of deployed MCUs and EV charging stations.

According to an embodiment in which PMCD program 107 has identified a geographic area within which a battery charging need is predicted to arise for one or more monitored electric vehicles, PMCD program 107 may, at 210, notify those monitored electric vehicles having a predicted battery charging need within the near future of their respective proximities to an available mobile charging unit deployed within the identified geographic area. As part of the notification PMCD program 107 may, in such an embodiment, display, via an infotainment system of the monitored electric vehicle, respective data of the deployed one or more mobile charging units including respective characteristics such as geographic location (i.e., their location within the identified geographic area), type of onboard EV battery charging equipment, and number & power levels of onboard batteries available for charge. Further, as part of the notification, PMCD program 107 may also display, via the infotainment or a navigation system of the monitored electric vehicle, the location(s) of the one or more mobile charging units within the identified geographic area relative to the location of the monitored electric vehicle, as well as routing information (i.e., a route and corresponding directions) to the identified geographic area or to a location of a mobile charging unit within the identified geographic area. Additionally, PMCD program 107 may display an EV battery charging monetary cost associated with each deployed mobile charging unit and allow the user to confirm or deny EV battery charging via a deployed mobile charging unit.

It may be appreciated that FIG. 2 provides only an illustration of some implementations and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

receiving data from a set of Internet-of-Things (IoT) enabled electric vehicles (EVs), wherein the data comprises a current percentage of remaining battery power for an IoT enabled EV of the set of IoT enabled EVs;

in response to determining that the current percentage of remaining battery power for the IoT enabled EV falls below a user specified EV battery threshold, selecting and deploying at least one IoT enabled mobile charging unit (MCU), from a set of IoT enabled MCUs, to a determined geographic location, wherein the selecting is based on evaluating an availability status of the at least one IoT enabled MCU, a geographic location of the at least one IoT enabled MCU, a type of EV battery charging equipment onboard the at least one IoT enabled MCU that is compatible with the IoT enabled EV, a number and respective power level of onboard batteries available for charge, and a range of travel of the at least one IoT enabled MCU, and wherein the determined geographic location is a location along a route being traveled by the IoT enabled EV; and notifying a user of the IoT enabled EV of availability of the selected at least one IoT enabled MCU at the determined geographic location.

2. The method of claim 1, wherein selection of the at least one IoT enabled MCU from the set of IoT enabled MCUs is based on an evaluation of data received from the at least one IoT enabled MCU and data received from the user.

3. The method of claim 1, further comprising:

based on the data received from the set of IoT enabled EVs, identifying a geographic area within which a battery charging need is predicted to arise for one or more IoT enabled EVs of the set of IoT enabled EVs;

deploying one or more IoT enabled MCUs of the set of IT enabled MCUs to the identified geographic area; and notifying those IoT enabled EVs predicted to have a battery charging need of availability of the one or more IoT enabled MCUs at the identified geographic area.

4. The method of claim 1, wherein the at least one IoT enabled MCU comprises a smart autonomous vehicle that can travel to the determined geographic location and provide an electric charge to a battery of the IoT enabled EV.

5. The method of claim 1, wherein the notifying further comprises:

displaying, via an infotainment system or a navigation system of the IoT enabled EV, a geographic location of the selected at least one IoT enabled MCU relative to a geographic location of the IoT enabled EV; and displaying, via the infotainment system or the navigation system, routing information to the determined geographic location.

6. The method of claim 3, wherein the notifying further comprises:

displaying, via respective infotainment or navigation systems of those IoT enabled EVs predicted to have a battery charging need, respective geographic locations of the one or more IoT enabled MCUs within the identified geographic area relative to respective geographic locations of those IoT enabled EVs predicted to have a battery charging need; and displaying, via the respective infotainment or navigation systems, routing information to the identified geographic area.

7. The method of claim 1, further comprising:

in response to determining that a current percentage of remaining battery power for an IoT enabled EV of the set of IoT enabled EVs falls below a user specified EV battery threshold, notifying the user of one or more EV charging stations within a range of the IoT enabled EV or located along a route being traveled by the IoT enabled EV; and displaying, via an infotainment system or a navigation system of the IoT enabled EV, respective geographic locations of the one or more EV charging stations relative to a geographic location of the IoT enabled EV.

8. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving data from a set of Internet-of-Things (IoT) enabled electric vehicles (EVs), wherein the data comprises a current percentage of remaining battery power for an IoT enabled EV of the set of IoT enabled EVs;

in response to determining that the current percentage of remaining battery power for the IoT enabled EV falls below a user specified EV battery threshold, selecting and deploying at least one IoT enabled mobile charging unit (MCU), from a set of IT enabled MCUs, to a determined geographic location, wherein the selecting is based on evaluating an availability status of the at least one IoT enabled MCU, a geographic location of the at least one IoT enabled MCU, a type of EV battery charging equipment onboard the at least one IoT enabled MCU that is compatible with the IoT enabled EV, a number and respective power level of onboard batteries available for charge, and a range of travel of the at least one IoT enabled MCU, and wherein the determined geographic location is a location along a route being traveled by the IoT enabled EV; and notifying a user of the IoT enabled EV of availability of the selected at least one IoT enabled MCU at the determined geographic location.

9. The computer system of claim 8, wherein selection of the at least one IoT enabled MCU from the set of IoT enabled MCUs is based on an evaluation of data received from the at least one IoT enabled MCU and data received from the user.

10. The computer system of claim 8, the method further comprising:

based on the data received from the set of IoT enabled EVs, identifying a geographic area within which a battery charging need is predicted to arise for one or more IoT enabled EVs of the set of IoT enabled EVs;

deploying one or more IoT enabled MCUs of the set of IoT enabled MCUs to the identified geographic area; and notifying those IoT enabled EVs predicted to have a battery charging need of availability of the one or more IoT enabled MCUs at the identified geographic area.

11. The computer system of claim 8, wherein the at least one IoT enabled MCU comprises a smart autonomous vehicle that can travel to the determined geographic location and provide an electric charge to a battery of the IoT enabled EV.

12. The computer system of claim 8, wherein the notifying further comprises:

displaying, via an infotainment system or a navigation system of the IoT enabled EV, a geographic location of the selected at least one IoT enabled MCU relative to a geographic location of the IoT enabled EV; and displaying, via the infotainment system or the navigation system, routing information to the determined geographic location.

13. The computer system of claim 10, wherein the notifying further comprises:

displaying, via respective infotainment or navigation systems of those IoT enabled EVs predicted to have a battery charging need, respective geographic locations of the one or more IoT enabled MCUs within the identified geographic area relative to respective geographic locations of those IoT enabled EVs predicted to have a battery charging need; and displaying, via the respective infotainment or navigation systems, routing information to the identified geographic area.

14. The computer system of claim 8, the method further comprising:

in response to determining that a current percentage of remaining battery power for an IoT enabled EV of the set of IoT enabled EVs falls below a user specified EV battery threshold, notifying the user of one or more EV charging stations within a range of the IoT enabled EV or located along a route being traveled by the IoT enabled EV; and displaying, via an infotainment system or a navigation system of the IoT enabled EV, respective geographic locations of the one or more EV charging stations relative to a geographic location of the IoT enabled EV.

15. A computer program product, the computer program product comprising:

one or more computer-readable tangible storage medium and program instructions stored on at least one of the one or more tangible storage medium, the program instructions executable by a processor capable of performing a method, the method comprising:

receiving data from a set of Internet-of-Things (IoT) enabled electric vehicles (EVs), wherein the data comprises a current percentage of remaining battery power for an IoT enabled EV of the set of IT enabled EVs;

in response to determining that the current percentage of remaining battery power for the IoT enabled EV falls below a user specified EV battery threshold, selecting and deploying at least one IoT enabled mobile charging unit (MCU), from a set of IoT enabled MCUs, to a determined geographic location, wherein the selecting is based on evaluating an availability status of the at least one IoT enabled MCU, a geographic location of the at least one IoT enabled MCU, a type of EV battery charging equipment onboard the at least one IoT enabled MCU that is compatible with the IoT enabled EV, a number and respective power level of onboard batteries available for charge, and a range of travel of the at least one IoT enabled MCU, and wherein the determined geographic location is a location along a route being traveled by the IoT enabled EV; and notifying a user of the IoT enabled EV of availability of the selected at least one IoT enabled MCU at the determined geographic location.

16. The computer program product of claim 15, wherein selection of the at least one IoT enabled MCU from the set of IoT enabled MCUs is based on an evaluation of data received from the at least one IoT enabled MCU and data received from the user.

17. The computer program product of claim 15, the method further comprising:

based on the data received from the set of IoT enabled EVs, identifying a geographic area within which a battery charging need is predicted to arise for one or more IoT enabled EVs of the set of IoT enabled EVs;

deploying one or more IoT enabled MCUs of the set of IoT enabled MCUs to the identified geographic area; and notifying those IoT enabled EVs predicted to have a battery charging need of availability of the one or more IoT enabled MCUs at the identified geographic area.

18. The computer program product of claim 15, wherein the at least one IoT enabled MCU comprises a smart autonomous vehicle that can travel to the determined geographic location and provide an electric charge to a battery of the IoT enabled EV.

19. The computer program product of claim 15, wherein the notifying further comprises:

displaying, via an infotainment system or a navigation system of the IoT enabled EV, a geographic location of the selected at least one IoT enabled MCU relative to a geographic location of the IoT enabled EV; and displaying, via the infotainment system or the navigation system, routing information to the determined geographic location.

20. The computer program product of claim 17, wherein the notifying further comprises:

displaying, via respective infotainment or navigation systems of those IoT enabled EVs predicted to have a battery charging need, respective geographic locations of the one or more IoT enabled MCUs within the identified geographic area relative to respective geographic locations of those IoT enabled EVs predicted to have a battery charging need; and displaying, via the respective infotainment or navigation systems, routing information to the identified geographic area.

* * * * *